United States Patent
Kretz-Busch et al.

(10) Patent No.: US 7,882,757 B2
(45) Date of Patent: Feb. 8, 2011

(54) GEAR ACTUATOR FOR A MOTOR VEHICLE TRANSMISSION DESIGN, MOTOR VEHICLE TRANSMISSION DESIGN WITH A GEAR ACTUATOR AS WELL AS MOTOR VEHICLE DRIVE TRAIN WITH A MOTOR VEHICLE TRANSMISSION DESIGN

(75) Inventors: Volker Kretz-Busch, Ottersweier (DE); Norbert Esly, Buehl (DE)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 1316 days.

(21) Appl. No.: 11/416,809

(22) Filed: May 3, 2006

(65) Prior Publication Data
US 2006/0266143 A1    Nov. 30, 2006

(30) Foreign Application Priority Data
May 7, 2005    (DE) .................... 10 2005 020 906

(51) Int. Cl.
F16H 59/00    (2006.01)
F16H 61/00    (2006.01)
F16H 63/00    (2006.01)

(52) U.S. Cl. ........................ 74/337.5; 74/335
(58) Field of Classification Search .............. 74/335, 74/337.5
See application file for complete search history.

(56) References Cited

U.S. PATENT DOCUMENTS

| 2,073,108 | A | * | 3/1937 | Kesling ................ 74/335 |
| 5,680,916 | A | * | 10/1997 | Borschert et al. .......... 192/20 |
| 6,105,448 | A | * | 8/2000 | Borschert et al. ......... 74/335 |
| 6,321,612 | B1 | * | 11/2001 | Leimbach et al. ......... 74/335 |
| 6,327,927 | B1 | * | 12/2001 | Rogg et al. ............. 74/335 |
| 2004/0112158 | A1 | | 6/2004 | Norum et al. | |

FOREIGN PATENT DOCUMENTS

DE    102 06 561    10/2002

* cited by examiner

Primary Examiner—Tisha D Lewis
(74) Attorney, Agent, or Firm—Simpson & Simpson, PLLC

(57) ABSTRACT

The invention relates to a gear actuator for a motor vehicle transmission design, that has several ratio steps for forming gears, whereby the gear actuator has a gear-shift shaft that is mounted so that it can rotate for the shifting of gears and that is mounted so that it can slide axially for the selection of gears and whereby the gear actuator also has a shift gate, whereby the shift gate also has a fixed mounted first shift gate part that is especially a shaft or an axle, as well as a second shift gate part that is mounted so that it can move axially and move in rotation or swivel, which is especially a disk or plate and is coupled with the gear-shift shaft and whereby the first shift gate part has several axially spaced recesses, into which the second shift gate part can be swiveled depending on its axial position.

6 Claims, 7 Drawing Sheets

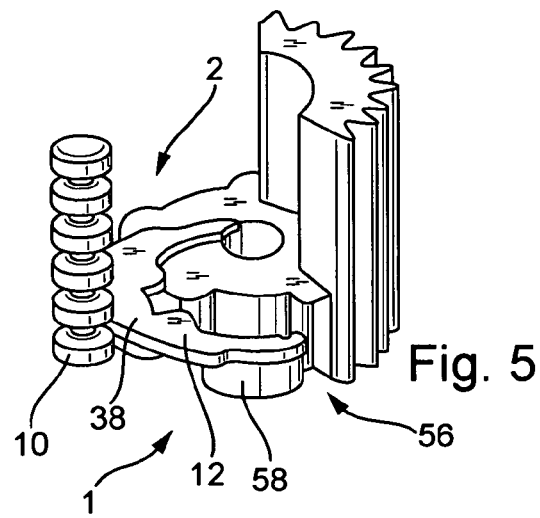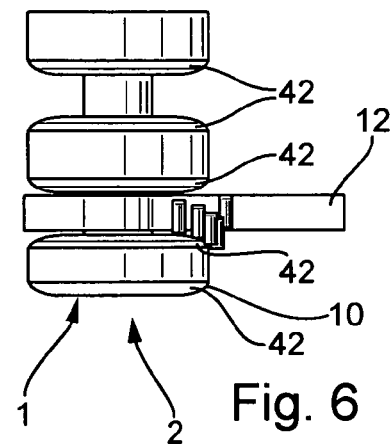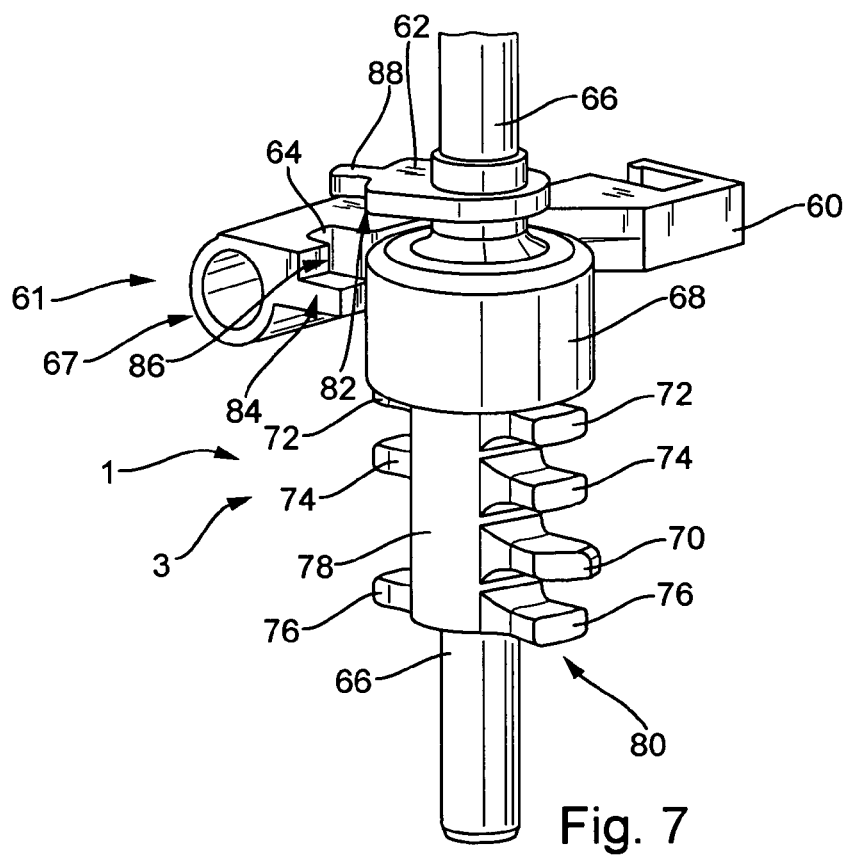

GEAR ACTUATOR FOR A MOTOR VEHICLE TRANSMISSION DESIGN, MOTOR VEHICLE TRANSMISSION DESIGN WITH A GEAR ACTUATOR AS WELL AS MOTOR VEHICLE DRIVE TRAIN WITH A MOTOR VEHICLE TRANSMISSION DESIGN

CROSS REFERENCE TO RELATED APPLICATIONS

This patent application claims priority of German Patent Application No. 10 2005 020 906.8, filed on May 7, 2005, which application is incorporated herein by reference.

The invention relates to a gear actuator for a motor vehicle transmission design, a motor vehicle transmission design with a gear actuator as well as a motor vehicle drive train with a motor vehicle transmission design.

BACKGROUND OF THE INVENTION

In addition to motor vehicle transmission designs, by means of which the ratio between the transmission input and the transmission output can be varied continuously, those also exist, e.g., by means of which the ratio discussed can be changed in steps.

The classic manual transmission, which has a number of gear sets for formation of ratio steps and/or gears, is an example of a stepped motor vehicle transmission design, in which the drive forces and/or energy required for gear change are applied completely by the driver of the motor vehicle.

In addition, e.g., (stepped) motor vehicle transmission designs are known that have a number of gear sets for forming ratio steps and/or gears, in which the drive forces and/or energy required for gear change are not applied completely by the driver of the motor vehicle. Designs of this type can also be designated as transmission designs with outside power support. Transmission designs frequently have an electromechanical actuator. By means of this actuator that forms the so-called external gear shift and/or is a component of such, a so-called inner gear shift can be actuated. In this case, the inner gear shift has a number of mechanisms and/or final output mechanisms. In this case, each of these final output mechanisms—usually one or two—is assigned to predetermined gears of the transmission that can be engaged and or disengaged by means of the associated final output mechanism, which to do this is correspondingly actuated by means of the gear actuator. Each of these final output mechanisms has a shift rail, shift fork or the like that is provided with an engagement zone, in which the actuator can engage for actuation. This engagement zone is generally formed of at least one shift jaw.

In addition, designs of the type mentioned above are known, in which the actuator has at least two electric motors. One electric motor that is also designated as selector motor is used to generate selecting movement and a second electric motor, also designated as shifting motor is used to generate shifting movement. It is also known that the selector motor is coupled with a central gear-shift shaft in such a way that it can move axially in its longitudinal direction for selection and that the shifting motor is coupled with this central gear-shift shaft in such a way that it can drive in rotation around its longitudinal axis for shifting. A shift finger or the like is provided on the gear-shift shaft that is moved with the gear-shift shaft and can act on a respective final output mechanism and/or shift rail during a shifting movement, and namely generally by way of their and/or its shift jaw.

A design of the previously mentioned type is known to be used, e.g., in automated manual transmissions (ASG).

In transmissions that have two drive train branches shifted in parallel and/or two dividing gears shifted in parallel, like, e.g., double-clutch transmission (DKG) and/or parallel transmission (PSG), known actuators with electric motors are also used. Since the goal of this type of transmissions is generally changing the gears without interruption in tensile force, in this type of transmissions in the scope of gear change processes by means of clutches or the like, there is a change between the dividing gears, whereby first a torque is transferred over a gear of one dividing gear, then at the same time a torque is transferred over both dividing gears, and after that, torque is only transferred over one gear of the other dividing gear. If both dividing gears each have several gears, the target gear must be engaged in the other dividing gear—if it is not already engaged—before the gear is disengaged in a dividing gear. In particular, in view of this, it has become known that in this type of transmission, actuators are used that have a selector motor and a shifting motor for each of the two dividing gears, i.e. a total of four electric motors.

In conventionally designed stepped motor vehicle transmission designs of the type named above—starting from the old gear—the following three steps occur in sequence over time: "disengagement of the old gear"—"selection"—"engagement of the target gear."

Besides that, the applicant has developed a motor vehicle transmission design, in which the selecting and/or selecting movement can occur before the disengagement of the old gear and/or a motor vehicle gear actuator that uses only one electric motor, which supplies the drive movements both for selecting and also the drive movements for shifting and thus can also be designated as a single-motor gear actuator.

In such designs, it is provided, e.g., that engagement geometries and/or a main actuating element and/or a shift finger is essentially only responsible for the engagement of gears and additional geometries take on the function of the disengagement of gears. In this case especially, disengagement geometries and/or so-called auxiliary actuating elements are used for the disengagement function. In this case, it can be provided, e.g., that the additional geometries, on one hand are located, e.g., on a central gear-shift shaft and on the other, on shift jaws that are provided on the named mechanisms and/or final output mechanisms and/or shift forks or shift rails or the like, but which can also be designed differently.

In most cases, disengagement geometries act in the gates in which the shift finger is not active. In this case it can be provided that a fixed allocation between shift finger and disengagement geometry thereby simultaneously represents an active gear lock. Design implementations of this solution are thus also designated as "active-interlock."

In such an "active-interlock," it is generally provided that the main actuating element and/or the shift finger can also be moved into a central and/or neutral position without disengaging the gear. In this case, the selecting movement is possible before the gear is disengaged.

Examples of this type of design with active-interlock and/or of single-motor gear actuators are explained, e.g. in DE 102 06 561 A1 by the applicant.

The invention is based on the goal of producing a simply designed motor vehicle gear actuator, by means of which the gears of a motor vehicle transmission can be engaged and disengaged with operational safety.

SUMMARY OF THE INVENTION

According to the invention, especially a motor vehicle gear actuator for a motor vehicle transmission design is suggested. Example designs of such a motor vehicle transmission design, for which the motor vehicle gear actuator according to the invention is intended, will be explained below. The gear actuator has a gear-shift shaft that is mounted so that it can rotate for the shifting of gears. The gear actuator also has a shift gate. The shift gate has a fixed mounted first shift gate part as well as a second shift gate part that is mounted so it is axially movable and can move in rotation and/or swivel or consists of these two shift gate parts. The first shift gate part is especially designed as a sort of a shaft and/or axle. The second shift gate part can be, e.g. a disk and in a preferable design is a plate. The second shift gate part is coupled with the gear-shift shaft. This coupling can be, e.g., such that the second shift gate part is mounted so it is fixed axially with respect to the gear-shift shaft, so the second shift gate part is moved axially when the gear-shift shaft is moved axially and that the second shift gate part is mounted so that it can turn in rotation with respect to the gear-shift shaft and is in driven in connection with the gear-shift shaft with respect to a rotary movement. Such a driving connection can be implemented, e.g., by means of gearing arrangement. However it can be provided that the coupling between the second shift gate part and the gear-shift shaft is such that the second shift gate part is connected tightly axially to the gear-shift shaft so that it turns with it, so the second shift gate part follows the rotary movement the gear-shift shaft as well as an axial movement of the gear-shift shaft in each case. It is provided that the first shift gate part has several axially spaced recesses, into which the second shift gate part can be swiveled depending on the axial position.

It is preferably provided that the shift gate has the effect that the turning capability of the gear-shift shaft depends on the axial position of this gear-shift shaft and/or that the axial movement capability of the gear-shift shaft depends on the swivel or rotation position of the gear-shift shaft.

The first shift gate part that is provided with several axially spaced recesses can be, e.g., an axle or shaft provided with undercuts. In particular this can be such that several axially spaced grooves, especially ring grooves, are provided in the, especially cylindrical, shroud surface of such a shaft and/or axle, each of which extends around the longitudinal axis of this shaft and/or axle. The axially spaced recesses can be, e.g., especially grooves and/or undercuts. As discussed, the second shift gate part can be swiveled, depending on its axial position, into the axially spaced recesses of the first shift gate part. This can especially be understood to mean that at least one area and/or section of this second shift gate part can be moved and/or swiveled into the corresponding recesses. In this case, the corresponding swivel axis can lie outside the recesses. In an advantageous design, it is provided that exactly one defined swivel axis is provided for the second shift gate part, which does not migrate during swiveling perpendicular to its direction of extension. However it can be provided that a swivel mechanism is designed in such a way that the swivel axis migrates during swiveling perpendicular to its direction of extension.

In particular, it is provided that the swivel axis of the second shift gate part and the position of the first shift gate part, especially the position of their recesses and the radial distance of the area and/or the areas of the second shift gate part that can swivel into the corresponding recesses, of the swivel axis of the second shift gate part is selected in such a way that the corresponding area of the second shift gate part that can swivel into the corresponding recesses can be swiveled into and out of it.

It can be provided—as already discussed—that the second shift gate part is a plate. It can especially be a plate with constant thickness. However it can also be provided that the plate varies in its thickness. In the area and/or in the areas of the plate and/or second shift gate part that can swivel into the recesses of the first shift gate part, the plate and/or second shift gate part is dimensioned in such a way that this swiveling capability into the recesses actually becomes possible and to do so is especially smaller than the corresponding height of the recess. The shift gate is preferably designed so that it is mechanical and/or purely mechanical.

It is especially provided that the central longitudinal axis of the gear-shift shaft is placed parallel to the longitudinal axis of the first shift gate part.

A shift gate is a device, especially a guide device, that restricts the adjusting capability of the actuator, especially of a gear-shift shaft of the actuator, essentially to an adjusting capability corresponding to a shift tracks-selection gates arrangement.

Advantageously, the number of axially spaced recesses of the first shift gate part corresponds to the number of shift tracks of the gear actuator. In particular, in such a design it can be provided that the same area and/or the same areas of the second shift gate part—with corresponding axial position—can always be swiveled into the corresponding recesses of the first shift gate part, so that the area and/or areas of the second shift gate part that can be swiveled into the recess and/or recesses of the first shift gate part does not depend on the identity of the respective recess. Besides that, it is especially provided that intermediate positions of the second shift gate part exist, in which this second shift gate part cannot swivel into the axially spaced recesses of the first shift gate part. The axially spaced recesses of the first part can each be limited by wall sections that are provided with guide chamfers. Because of this, a situation can especially be achieved in which, e.g., during incorrect positions in selecting direction caused by the control where the selecting position of a gear and/or shift track to be approached is not reached, it is still possible to move into this target shift and/or gear gate, whereby a corresponding correction of the selecting position is achieved by the guide chamfers. In a corresponding manner, guide chamfers of this type—alternatively or additionally—can be provided on the second shift gate part and especially in the area that is intended to be swiveled into the corresponding recesses of the first shift gate part.

The guide chamfers are advantageously of large size.

It can be provided that that such guide chamfers—in axial direction—are arranged on both sides, i.e., on each of the wall sections of the first shift gate part that limit the shift track in the opposite orientation of the axial direction and/or axially in the area of the two ends of the area and/or the areas of the second shift gate part that can be swiveled into the corresponding recesses of the first shift gate part.

In an especially advantageous design, it is provided that the axially spaced recesses of the first shift gate part are assigned to different shift tracks of the gear actuator. In this case, it is especially provided that in the positions of the gear actuator, in which it is positioned outside of a shift track and/or from which it cannot be shifted into a shift track, the first and the second shift gate part each engage in each other essentially with positive fit to block a swiveling capability of the second shift gate part. This positive engagement is especially such that, because of the positive engagement, the swiveling capability of the second shift gate part is blocked, but the movement of the second shift gate part in selecting direction and/or in axial direction is ensured. This is especially true, in that at least one swivel position or a swivel positions range of the second shift gate part exists, into which it can be moved axially and/or in selecting direction in such a way that all of the axial positions can be approached, from which it can swivel into the recesses. In intermediate positions between these axial positions, in which the swiveling capability exists, the swivel movement capability of this second shift gate part is especially blocked.

In an advantageous design, it is provided that in positions of the second shift gate part, in which it is swiveled into a recess of the axially spaced recesses of the first shift gate part, a positive engagement exists between the first and the second shift gate part in selecting direction and/or in axial direction of the first shift gate part. This positive engagement is especially such that a selection and/or an axial movement of the second shift gate part, and thus especially an axial movement and/or selecting movement the gear-shift shaft, is locked and/or is blocked. However, the positive engagement is advantageously not such that a swiveling of the second shift gate part from this positive engagement position is prevented.

The gear actuator is preferably designed as a single-motor gear actuator. This is especially true in that the gear actuator has exactly one electric motor, by means of which the drive movement for the selection of gears, as well as for the shifting of gears, can be generated.

In an advantageous further development of the invention, it is provided that the gear actuator for a motor vehicle transmission design is provided that has an inner gear shift with several final output mechanisms, by means of which the gears of the motor vehicle transmission design can be engaged and disengaged, whereby the gear actuator has at least one main actuating element, like e.g. a shift finger, for actuating final output mechanisms for engagement of gears, as well as several auxiliary actuating elements for the actuation of final output mechanisms for disengagement of gears. In this case, it is provided that at least one main actuating element for the selection of gears can move axially and can move in rotation for the shifting and/or engagement of gears. Besides that, in this design it is provided that the auxiliary actuating elements for the disengagement of gears can move in rotation. In this case it is especially provided that the at least one main actuating element and the auxiliary actuating elements are arranged at and/or on the gear-shift shaft. This arrangement can be such that it is e.g. fixed axially and in rotation.

Preferably the gear actuator is provided with an active-interlock mechanism and/or designed in such a way that it can interact as a sort of active-interlock mechanism with an inner gear shift of a motor vehicle transmission design.

According to the invention, a gear actuator is also especially suggested—and this can especially also be a preferred further development of the previously mentioned design—for a motor vehicle transmission design, that has ratio steps for forming several gears and that has an inner gear shift with several final output mechanisms, of which one is designed for actuating the reverse gear of the transmission design and of which the other one is for actuating the forward gears of the transmission design. In this case, the gear actuator has at least one main actuating element, like a shift finger, for actuating the final output mechanisms assigned to the forward gears for engagement of gears, as well as several auxiliary actuating elements for actuating the final output mechanisms of the forward gears for disengagement of gears. Besides that, the gear actuator has an actuating element, like e.g., a shift finger, for actuating final output mechanism assigned to the reverse gear for engagement and disengagement of the reverse gear. A design like this can be, e.g. such that the main actuating element and the auxiliary actuating elements are components of an active-interlock mechanism for the forward gears, which is such that this active-interlock mechanism ensures that in the transmission and/or a respective dividing gear of this transmission, only one forward gear can be engaged simultaneously. In this case it is especially provided that the main actuating element, by means of which such forward gears can be engaged, can be moved back to its neutral position after the engagement of a forward gear without these forward gears being disengaged again in the process. The auxiliary actuating elements of the active-interlock mechanism are much more responsible for the disengagement the forward gears.

With respect to the reverse gear, however, one actuating element is provided there that is responsible both for the engagement and for the disengagement of the reverse gear. This actuating element is especially (also) a shift finger.

The main actuating element is also connected with the auxiliary actuating elements functionally in such a way that it is ensured that all of the remaining forward gears of the transmission and/or of the same dividing gear are disengaged before a new target gear is engaged by means of the main actuating elements. It can also be provided that the actuating element that is provided for the engagement and disengagement of the reverse gear is functionally connected with the auxiliary actuating elements in such a way that it is ensured that all of the gears of the transmission and/or of the same dividing gear, in which the reverse gear is provided, are disengaged before the reverse gear is engaged, for which reason the auxiliary actuating elements are provided. However, it is especially not provided that the auxiliary actuating elements and/or a auxiliary actuating element act on a reverse gear if a forward gear will be engaged.

For disengagement of the reverse gear, the actuating element that is actually responsible for the engagement and disengagement of the reverse gear is especially provided.

In an especially preferred further development, the gear actuator has a first blocking part that can have a blocking effect on the final output mechanism assigned to the reverse gear in order to hold it in a neutral position, i.e., in a position in which the reverse gear is disengaged. Such a first blocking part can be designed, e.g., as a (first) blocking cylinder. The (first) blocking cylinder can be arranged, e.g., on the gear-shift shaft and in fact, especially concentrically. In this case, it is provided that the at least one main actuating element for the engagement of gears is mounted so it can move in rotation and can move axially for the selection of gears. As already discussed, such a main actuating element can be designed, e.g., as a shift finger and fastened on the gear-shift shaft. Besides that, it is further provided in the development that the auxiliary actuating elements for the disengagement of forward gears are mounted so that they can move in rotation. These auxiliary actuating elements are preferably also mounted fixed on the gear-shift shaft and designed, e.g., in the manner of radially projecting wings. It is additionally provided according to this preferable design that the actuating element, which is provided for the engagement and for the disengagement of the reverse gear can move axially for selecting and can move in rotation for the engagement and disengagement of the reverse gear. According this preferable design, the first blocking part extends axially over a length that is at least as large as the maximum axial distance between two positions of the at least one main actuating element, from which, in each case a final output mechanism assigned to a forward gear can be actuated by turning this main actuating element for engagement of a forward gear. This is especially true in that it is ensured that any forward gears can be shifted in succession, whereby in this shifting process it is continuously ensured that the reverse gear is in the locked-disengaged position. This means it is especially provided that the reverse gear can be held permanently in a blocking position during changing of forward gears. In addition, it is especially provided that after the engagement of a forward gear, it remains engaged when the main actuating element with which this forward gear was previously engaged is moved back into its neutral position, from which a selection can be made. In contrast, the reverse gear in this preferable design is disengaged directly if it has previously been engaged by means of the corresponding actuating element and it is moved back into its neutral position.

Besides that, according to the invention a motor vehicle transmission design with several ratio steps for the formation of gears is especially suggested that also has an inner gear shift as well as a gear actuator for the actuation of the inner gear shift. In this design, the gear actuator is also designed according to the gear actuator of the invention.

The motor vehicle transmission design is preferably a parallel transmission (PSG) or a manual transmission free of interrupts (USG) or a double-clutch transmission (DKG).

The inner gear shift especially has several final output mechanisms that have already been mentioned above. This type of final output mechanism can be such that it has several shift rails, each of which is provided with a shift jaw. This shift jaw is designed so that the at least one main actuating element and/or the auxiliary actuating elements and/or an actuating element for the reverse gear can engage in it with actuation in order to move the corresponding final output mechanism, and especially the shift rail, axially and/or in the direction of its longitudinal extension direction. In addition to such a shift rail, the respective final output mechanism can have a shift sleeve that is coupled directly to the shift rail or by way of elements connected between them. The ratio steps forming the gears can have (toothed) gear sets, of which one gear wheel is mounted fixed on a shaft holding this gear wheel and of which one other gear wheel is mounted on a shaft holding this other gear such that it can move in rotation with respect to this shaft. For example, using the shift sleeve and/or a gear coupling or an element with the same function, a rotary connection can be created between the gear wheel that is mounted so it can rotate and/or the loose gear and the shaft holding this gear wheel, so that a torque can be transferred over the mentioned shaft and the respective gear wheel step. For this purpose it can be provided that by actuation of the corresponding shift rail, the corresponding shift sleeve and/or gear coupling is moved accordingly in order to create or release the rotation connection between one respective gear wheel and the associated shaft. The shift rails are preferably mounted so they can move axially and/or in the direction of their longitudinal extension.

Besides that, it can be provided that the final output mechanisms have synchronizing devices.

According to the invention a motor vehicle drive train is also suggested with a transmission design according to the invention.

BRIEF DESCRIPTION OF THE DRAWINGS

In the following, example designs of the invention will now be explained in more detail using the figures, which show:

FIGS. 5 and 6 show a second example embodiment of a gear actuator according to the invention in partial view, whereby these figures show several views;

FIGS. 7 to 10 show an example embodiment of a gear actuator according to the invention in partial view, whereby these figures show several views;

DETAILED DESCRIPTION OF THE INVENTION

Figure 1:
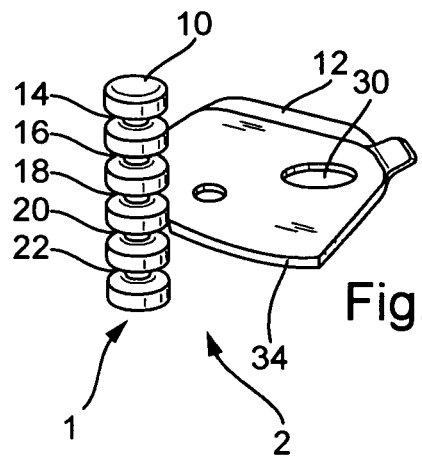
FIGS. 1 to 4 show a first example embodiment of a gear actuator according to the invention in partial view, whereby these figures show several views.
Figure 2:
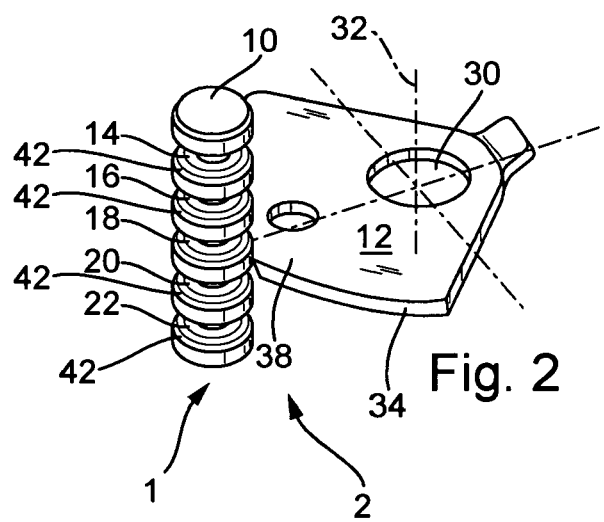
Figure 3:
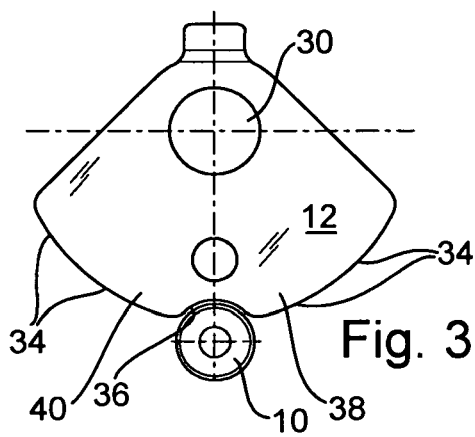

FIGS. 1 to 4 show an example embodiment of a gear actuator according to the invention in four partial views. They especially show the shift gate and/or shift gate 2 of a gear actuator 1. In FIGS. 1 and 2, this shift gate 2 is shown in two diagonal views. In FIG. 3, the shift gate 2 is shown in a top view and in FIG. 4; the shift gate 2 is shown in a side view.

The shift gate 2 is essentially made up of two components, namely of the first shift gate part 10 and the second shift gate part 12. In the embodiment example, the first shift gate part 10 is a shift gate axle and/or shaft 10 with several undercuts and/or grooves 14, 16, 18, 20, 22. The grooves 14, 16, 18, 20, 22 are formed as ring grooves here. In axial direction, the axle and/or shaft 10 is seated tightly in a housing—which is not shown in FIGS. 1 to 4. This housing can be, e.g., a housing of the gear actuator. It can also be provided that the shift gate axle and/or shaft is fastened in the (actuator) housing is such a way that it is mounted there so that it moves with it in rotation and axially.

Figure 4:
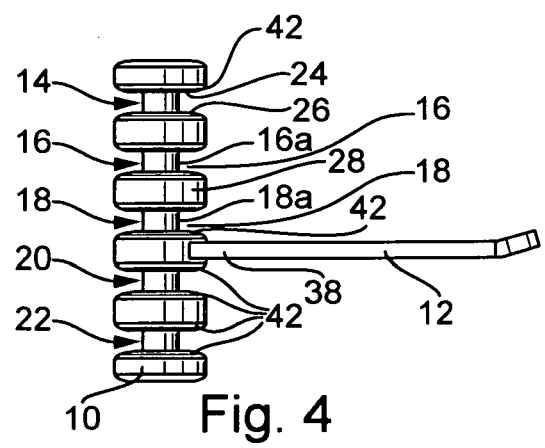

The grooves 14, 16, 18, 20, 22 are axially spaced so they are limited axially on both sides by wall sections, which as an example are provided with the reference numbers 24 and 26 for the groove 14 in FIG. 4 and exist correspondingly with the grooves 16, 18, 20, 22. Between each two adjacent grooves 14, 16 and/or 16, 18 and/or 18, 20 and/or 20, 22, in each case a radial projection is formed that is opposite the respective groove base of the adjacent groove, which is also designated as an elevation or profile elevation This is shown, for example, for radial projections 28 in FIG. 4 that are formed there between the grooves 16 and 18. The corresponding groove base of the grooves 16, 18 is provided with the reference numbers 16a and/or 18a. In each case, a radial projection is also formed axially outside the grooves and/or undercuts 14, 22 that lie on the outside.

In this embodiment example, the second shift gate part 12 is a plate and is also designated as an intermediate plate or shift gate plate. The shift gate plate 12 is fastened on the gear-shift shaft of the gear actuator 1. This gear-shift shaft is actually not shown in FIGS. 1 to 4; what is shown is that the shift gate plate 12 has a passage opening 30 for mounting the gear-shift shaft. The gear-shift shaft extends through this passage opening 30. In this case, it is especially provided that the gear-shift shaft is connected to the shift gate plate 12 so that it moves with it in rotation and axially. However it can also be provided that the shift gate plate 12 is fastened on the gear-shift shaft and the gear-shift shaft does not extend through a passage opening 30 of the shift gate plate 12.

The central longitudinal axis of the gear-shift shaft that is not shown is indicated schematically in FIG. 2 by the reference number 32. This central longitudinal axis 32 of the gear-shift shaft extends essentially parallel to the longitudinal axis of the first shift gate part 10.

The second shift gate part and/or the shift gate plate 12 are, in this embodiment example, designed as a sort of an arc sector, which in this case covers about 90°. However, there can also be other shapes, like e.g. a semi-circular design or a circular design. In this embodiment example, a radially outer section of the second shift gate part and/or shift gate plate 12 that is provided with the reference numbers 34 in FIGS. 1 to 3, forms an arc in cross section considered perpendicular to the longitudinal axis 32 and/or direction of thickness of the shift gate plate. Besides that, the second shift gate part and/or shift gate plate 12 has a recess 36 radially outside and/or in the area of the arc 34. In the embodiment example, this recess 36 interrupts the arc shape. This recess 36 is designed in such a way that it makes two things possible in cooperation with the first shift gate part 10 two. For one thing, because of this design a movement the gear-shift shaft in shifting direction is prevented, i.e., a swivel and/or rotary movement in certain axial positions the gear-shift shaft and/or of the shift gate plate 12; and on the other, because of the formation of the recess 36, a selection is made possible in specific swivel settings of the shift gate plate 12 in cooperation with the first shift gate part 10. As discussed, the axial movement of the gear-shift shaft corresponds to the selecting movement the gear-shift shaft and the rotation and/or swivel movement of the gear-shift shaft corresponds to the shifting movement the gear-shift shaft. Since in this embodiment example, the second shift gate part and/or shift gate plate 12 is tightly coupled with the gear-shift shaft, the second shift gate part and/or shift gate plate 12 will be moved along accordingly.

In the embodiment example according to FIGS. 1 to 4 it is now provided, for blocking the shifting movement in specific selection settings and to make selection possible in specific shifting positions, that the recess 36, on one hand, and the radial projections, like projection 28 of the first shift gate part 10, on the other, are each profiled in such a way that these can engage with each other with essentially positive engagement, and namely with such positive engagement that turning and/or swiveling in corresponding axial positions is blocked. In the embodiment example, this is such that the above-mentioned radial projections, like projection 28, and/or elevations of the first shift gate part 10 form a cylindrical shroud surface and the recess 36 essentially has an arc shape in cross section, whereby the radius of the arc of the recess 36 of the second shift gate part 12 essentially corresponds to the radius of the profile elevation of the first shift gate part 10, like profile elevation 28. In an advantageous manner, all of the profile elevations and/or radial projections of the first shift gate part 10—at least radially on the outside—are formed essentially the same, and in fact, especially with the same radius. Because of this form coordination, in corresponding blocking positions the second shift gate part 12 engages the corresponding profile elevations partially with its recess, like profile elevation 28 of the first shift gate part 10, so that a swiveling of the second shift gate part 12 and thus of the gear-shift shaft is prevented. The design of the corresponding elevations, like elevation 28 of the first shift gate part 10, as well as the design of the recess 36 of the second shift gate part 12 is such that in the corresponding swivel position of the second shift gate part 12, this second shift gate part 12—and thus the gear-shift shaft—is mounted so it can move axially and thus in selecting direction. This is especially true in that, during an axial movement, the second shift gate part 12 can be moved axially essentially in the area of any of the recesses and/or grooves 14, 16, 18, 20, 22. Since the grooves and/or undercuts correspond to the respective shift tracks of the gear actuator 1, the gear-shift shaft can thus be moved in the area of any shift track so selecting is made possible. As discussed, in the area of the profile elevations and/or projections of the first shift gate part 10, like e.g., profile elevation 28, the swiveling of the second shift gate part 12 and thus a swiveling of the gear-shift shaft is blocked, so that a shifting movement is blocked in intermediate positions between the shift tracks. As discussed, the profile recesses and/or undercuts and/or grooves 14, 16, 18, 20, 22 are provided between profile elevations and/or radial projections of the first shift gate part 10. These grooves and/or recesses 14, 16, 18, 20, 22 are designed in such a way that the second shift gate part and/or the shift gate plate 12 can swivel into these grooves 14, 16, 18, 20, 22 if the shift gate plate 12 is positioned in a corresponding axial position. The corresponding axial positions are not shown in any of the FIGS. 1 to 4.

FIG. 4 actually shows a position, in which the swiveling of the shift gate plate 12 around its swivel axis, which in this case corresponds to the central longitudinal axis 32 of the gear-shift shaft, is blocked; using this Figure it will become clear that the second shift gate part and/or shift gate plate 12 in axial direction can be moved in an area, in which it can be swiveled and/or can be swiveled into a undercut and/or a groove 14 and/or 16 and/or 18 and/or 20 and/or 22. In this case, in this embodiment example the shift gate plate 12 naturally does not drop entirely into the corresponding recess and/or groove and/or undercut 14, 16, 18, 20, 22 of the first shift gate part 10, but only one area 38 and/or 40 of the shift gate plate 12, and actually especially an area that lies radially outside, which follows the recess 36. In this case, it is such that, starting from a neutral position of the second shift gate part 12 in which its movement ability is not blocked axially and it can be moved into the axial area of any of the grooves, by swiveling in a first orientation the area 38 can swivel into a corresponding groove 14, 16, 18, 20, 22 of the first shift gate part 10 and by swiveling in the second orientation opposite this first orientation, the area 40 can swivel into the groove, whereby it is naturally necessary that the shift gate plate 12 is in axial position with respect to the first shift gate part 10, in which a swiveling of the shift gate plate 12 is made possible.

Because of the fact that the shift gate plate 12 can dip into or swivel into a corresponding recess and/or undercut and/or groove 14, 16, 18, 20, 22 of the first shift gate part 10, the swiveling capability the gear-shift shaft is made possible in each of the corresponding positions of the gear-shift shaft, so that the gear-shift shaft can execute a corresponding shifting movement.

The shift gate inside of the gear actuator 1 especially has the task of permitting the rotation of the gear-shift shaft only in very specific axial positions of the gear-shift shaft. For this purpose and/or especially for this purpose, the axle and/or shaft 10 was produced that has several undercuts and/or grooves 14, 16, 18, 20, 22 and is seated tightly in a housing axial direction. On the gear-shift shaft, a plate 12 is fastened that can swivel into the undercuts 14, 16, 18, 20, 22 during rotation the gear-shift shaft. The swiveling is only successful if the gear-shift shaft, and thus the plate 12, has the correct position with respect to the axle 10.

As long as the shift gate plate 12 has the corresponding and/or correct position with respect to axle and/or shift gate shaft 10 and/or the corresponding axial position, during rotation of the gear-shift shaft the plate can swivel into the undercuts 14, 16, 18, 20, 22 and/or into each of these undercuts 14, 16, 18, 20, 22. The example design version of the shift gate function according to FIGS. 1 to 4 and/or design construction of the shift gate 2 inside the transmission actuator shown there is also designed in a simple manner and functions with operation safety.

It should be noted that an example design will be explained using FIGS. 1 to 4, in which the recess has the shape of an arc section in cross section and the profile elevations, like e.g., profile elevations 28, have a cylindrical shroud surface section, which in a simple manner is essentially adapted to the recess 36. It is understood that other interacting shapes can also prevent the corresponding swiveling outside the shift tracks. This means it could be provided, e.g. that the recess 36 and the corresponding radial projections 28 are each shaped with angles. Besides that, it could be provided that instead of the recess 36 a projection that extends beyond the arc shape 34 or a radially outer limit of the second shift gate part 12 that is shaped in another way is provided that can interact with a recess, like an axial passage, provided in a projection and/or profile elevation of the first shift gate part 10 for blocking the swivel movement of the second shift gate part 12 and/or the gear-shift shaft.

The gear actuator 1 can be, e.g., the gear actuator of a parallel transmission (PSG) or double-clutch transmission (DKG) or automated manual transmission (ASG) and/or be designed as for one of these systems named as an example.

FIGS. 5 and 6 show a second example embodiment of the invention, which is especially a modification of the design explained in FIGS. 1 to 4 in partial view.

FIGS. 5 and 6 especially show gear actuator 1 in partial view, which has an internal shift gate 2. In this case it can especially be provided that the position of the gear-shift shaft in selecting direction is determined by the internal shift gate 2 and vice versa.

The shift gate 2 is essentially made of two components, namely the first shift gate part 10 and the second shift gate part 12. The first shift gate part 10 can especially be designed and arranged and/or mounted essentially as explained in FIGS. 1 to 4.

In this case, the second shift gate part 12 is designed as a plate and/or shift gate plate and/or intermediate plate and differs from the shift gate plate according to FIGS. 1 to 4 with respect to its shape. In the design according to FIGS. 5 and 6, the intermediate plate 12 is essentially sickle-shaped, as shown well in FIG. 5.

The intermediate plate 12 is fastened on a gear wheel 56, which in turn sits on a gear-shift shaft 58. The intermediate plate 12 thus has a direct correlation to gear-shift shaft 58. The first shift gate part 10, that is a (shift gates) axle and/or (shift gates) shaft, is fastened inside an actuator housing that is not shown.

The intermediate plate 12 has a radial section 34 lying radially outward that is designed as an arc in cross section observed perpendicular to the thickness direction of the intermediate plate 12. This section 34 that is arc shaped is interrupted by a recess 36 in the radially outer section of the intermediate plate 12, that differs with respect to its shape from the recess 36 of the plate 12 explained with FIGS. 1 to 4. This recess 36, in the design according to FIGS. 5 and 6—deviating from the design according to FIGS. 1 to 4—is not designed with negative contour adapted to the shape of the radial projections and/or profile elevations of the first shift gate part 10 or designed as a recess that is arc shaped in cross section, but much more as a recess that is almost angular.

Still, the design of this recess 36 is such that, in its swivel direction, the intermediate plate 12 has a position in which it can be moved freely axially, i.e. without being blocked, to any of the grooves 14, 16, 18, 20, 22 of the first shift gate part 10, into which it can then be swiveled with at least area 38, 40.

As discussed, with a design according to FIGS. 5 and 6, the axle and/or shaft and/or the first shift gate part 10 also has several grooves according to shift track (selecting position) of the gear actuator.

The intermediate plate 12 also has a free position, whereby the selecting movement is made possible into the position in which the intermediate plate is in a neutral position in shifting direction. If the gear actuator 1 is outside of a shift track, also especially axially outside of a shift track, a positive engagement develops between the outer diameter of the axle and/or shaft and/or of the first shift gate part 10 and the free position of the intermediate plates 12, so the shifting is blocked. To the extent that the intermediate plate is arranged axially in areas from which it can be swiveled into the and/or into each of the grooves and/or recesses 14, 16, 18, 20, 22 of the first shift gate part 10, the intermediate plate 12 swivels by a shifting movement into the grooves and/or the corresponding groove of the axle and/or shaft and/or of the first shift gate part 10. Because of this a positive engagement occurs in selecting direction, so the selecting is blocked. In a corresponding manner, in the design according to FIGS. 1 to 4, the intermediate plate 12 is then in a (respective) position, in which the selecting is blocked, and the intermediate plate—and thus also the gear-shift shaft—can not move axially or only moves in a very restricted way if this intermediate plate 12 is in a swivel position, in which it extends into the grooves 14, 16, 18, 20 and/or 22 and/or engages there.

In the following, a few other designs and/or characteristics will now be explained in detail that can be used in the design according to FIGS. 1 to 4 and/or in the design according to FIGS. 5 and 6 or in another further development according to the invention.

The gear actuator 1 can have a first electric motor, which generates the selecting movement as well as a second electric motor different from that, which generates the shifting movement. However, alternatively to this, it can also be provided that the gear actuator 1 has exactly one electric motor, which generates the movements both for shifting and for selecting.

This can be such, e.g. that the rotary movement of the output shaft of these electric motors corresponds in one orientation to the movement for shifting and the rotary movement of this output shaft of the electric motor corresponds in the opposite orientation to a movement for selecting. In this case it can be provided that a corresponding mechanism is provided, which changes the rotary movement of one of these two orientations, namely the rotary movement for selecting, into an axial movement the gear-shift shaft and the rotary movement in the opposite orientation into a rotary movement of the gear-shift shaft for the shifting.

However it can especially be provided that the gear actuator is a single-motor gear actuator. In addition, it can be provided that the gear actuator is provided with an active-interlock mechanism.

Both for a design in which the gear actuator has only one electric motor that provides the drive movement for the selecting and for the shifting, and also for designs in which separate electric motors are provided for generating the selecting movement, on one hand, and the shifting movement on the other, it can be provided that the electric motor and/or the electric motors are in signal connection with an electronic control unit. In this electronic control unit control programs and especially software can be stored, which control the gear change and/or the actuator actuation. This can especially be true in that the control program and/or the software activate and/or deactivate the electric motor and/or electric motors by corresponding application of current.

For reasons of the interaction between the gear actuator 1 and the control program and/or software, it can be necessary in specific embodiments to equip the shift gate with base play so that a movement of the gear actuators is possible both in shifted position as well as in an intermediate position in shift gates. Because of the control inaccuracies and the kinematic play of the gear actuator, the shift tracks can be approached imprecisely if necessary. In order to prevent forcing of the selection kinematics and/or selection mechanism with the shift gate, it may make sense here, or even be necessary with certain designs, that the shift gate play is very great. On the other hand, the interaction with the internal shifting mechanism of the transmission can require a very precise positioning of the gear-shift shaft. To fulfill these two conflicting requirements of the shift gate 2—and/or for other reasons—it can be provided that the shift gate 2 has large guide chamfers and/or is provided with large guide chamfers. Because of this, e.g. incorrect positions because of a wide shift gate jaw are compensated and the position can be corrected by a gliding on the flanks. This can be achieved, e.g. because of the special design of the grooves 14, 16, 18, 20, 22 inside the axle and/or shaft and/or of the first shift gate parts 10. The design of the grooves 14, 16, 18, 20, 22 (especially angle, neutral play) can be coordinated individually to the current relationships of incremental resolutions and kinematic play. It should be mentioned, in particular with respect to the incremental resolution, that the gear actuator according to FIGS. 1 and 4, as well as the gear actuator according to FIGS. 5 and 6 and/or a gear actuator in a preferable design that is in the scope of the invention, has at least one incremental position measuring device by means of which the movements and/or positions and/or position changes of the actuator can be determined and/or recorded. This can be such that, e.g., an incremental position sensor is provided for the electric motor and/or each of the electric motors and/or their output shaft(s).

The moving direction of the shifting movement can also be determined by the narrowing shift gate shape provided here as an example.

In the embodiment examples according to FIGS. 1 to 4 and/or according to FIGS. 5 and 6, this type of guide chamfers are provided with the reference numbers 42. For reasons of clarity, not every one of the guide chamfers is provided with the reference numbers 42. FIG. 4 especially shows that, for the grooves, a guide chamfer is provided axially on both sides at the groove limits.

FIGS. 7 to 10 show an example of a transmission design 3 according to the invention with an example of a gear actuator 1 according to the invention in partially schematic view.

A specific reverse gear design and/or a shift rail 60 is especially shown there, by means of which the reverse gear can be actuated, and—in partial view—a gear actuator 1 is shown, by means of which the shift rail 60 of the reverse gear can be actuated for the engagement and disengagement of the reverse gear, among other things.

The shift rail 60 for the reverse gear, which is especially a component of a (partially shown) inner gear shift 61, to which the shift rails for the forward gears also belong, has a shift jaw 64 that forms an engagement zone for an actuating element 62. This actuating element 62 is designed as a (second) shift finger and component of the gear actuator 1. The gear actuator 1 also has a gear-shift shaft. This gear-shift shaft 66 can move axially for selecting and in rotation for shifting. A shift gate 2 can be provided that can be of a type as was explained using FIGS. 1 to 4 and/or FIGS. 5 and 6 and interacts correspondingly with the gear-shift shaft 66. The inner gear shift 61 has several mechanisms and/or final output mechanisms. Each of these final output mechanisms has a shift rail, as well as a shift sleeve or a component with the same function or similar function for alternatively creating or releasing a rotary connection of a gear wheel of a gear set with a shaft that holds this gear wheel. In FIGS. 7 to 10, the final output mechanisms of the forward gears are not shown and the final output mechanism 67 of the reverse gear is shown only partially in the form of the shift rail 60.

The actuating element 62 already discussed that is provided for the engagement and for the disengagement of the reverse gear, and to do this, can act accordingly on the shift rail 60 of the reverse gear, sits on the gear-shift shaft 66. This actuating element 62 designed here as a (second) shift finger belonging to the gear actuator, is used here to slide the shift rail 60 of the reverse gear.

On the gear-shift shaft 66 of the gear actuator 1, a first blocking part 68 for the reverse gear also sits. In this example, this (first) blocking part 68 is a blocking cylinder, and therefore in the following will be designated as first blocking cylinder 68 for simplification, whereby it should be noted that instead of a first blocking cylinder 68, a first blocking part 68 that is formed in another way can be provided. The first blocking cylinder 68 can be manufactured separately from the gear-shift shaft 66 and then mounted on it or be manufactured to form one unit with the gear-shift shaft 66. The first blocking cylinder 68 moves axially, and possibly also rotates, with the gear-shift shaft 66.

On the gear-shift shaft 66, a main actuating element 70 is located, as well as several auxiliary actuating elements 72, 74, 76. The forward gears can be engaged by means of the main actuating elements 70. To do this, the main actuating element 70 can engage with actuation in a corresponding shift rail of a forward gear. For this purpose, the shift rails of the forward gears have shift jaws. By means of the auxiliary actuating elements 72, 74, 76 the forward gears can be disengaged and/or blocked. To do this, the auxiliary actuating elements 72, 74, 76 engage with actuation and/or blocking in the shift rails of the forward gears. Separate shift jaws can be provided for this engagement; i.e. shift jaws that are different from those that are provided for engagement of the main actuating elements 70 are provided. It can also be provided that the shift jaws of the shift rails of the forward gears, in which the main actuating element 70 can engage with actuation, are also intended for the engagement of auxiliary actuating elements 72, 74, 76, so that only one shift jaw is provided on the respective shift rails. The interaction of the main actuating elements 70 with the auxiliary actuating elements 72, 74, 76 and the shift rails of the forward gears is especially such that it is ensured that in each case, only one forward gear of the transmission and/or of the same dividing gear can be engaged simultaneously.

This is especially true in that, by means of the auxiliary actuating elements 72, 74, 76, it is ensured that all the (forward) gears of the transmission and/or of the dividing gear in which the respective target gear is arranged, other than the one assigned to the shift track of the target gear, are disengaged by means of the auxiliary actuating elements 72, 74,

76—if they are not already—before the target gear is engaged by means of the main actuating element 70.

Figure 8:
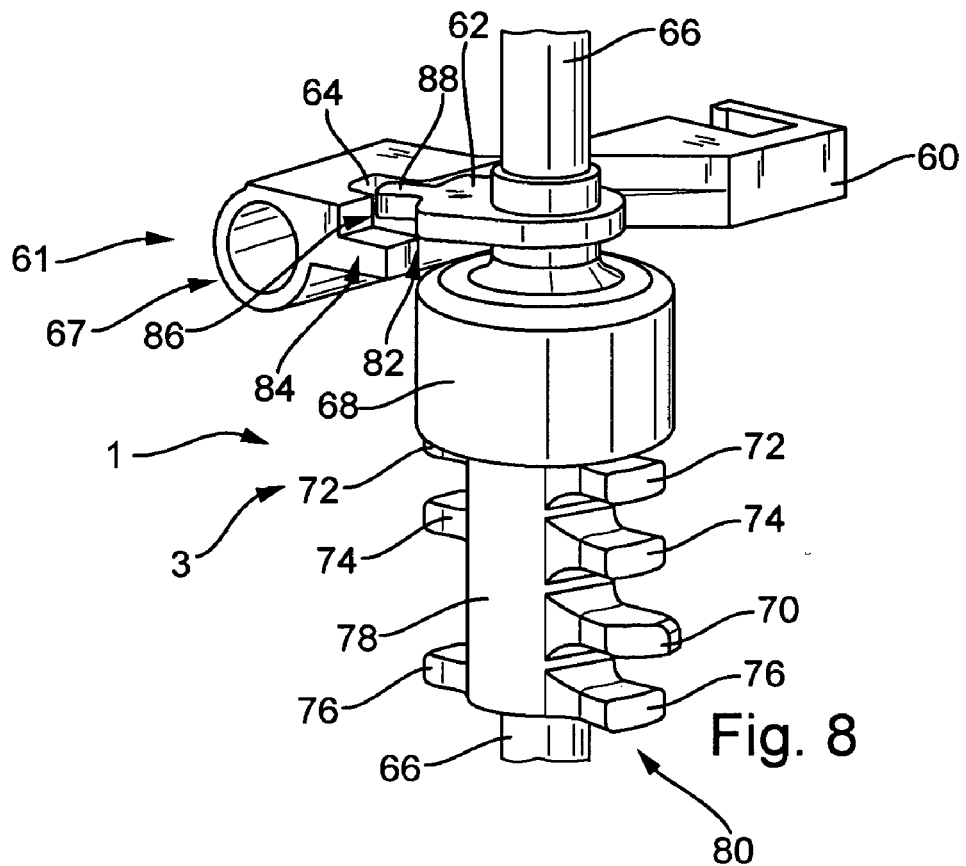
Figure 9:
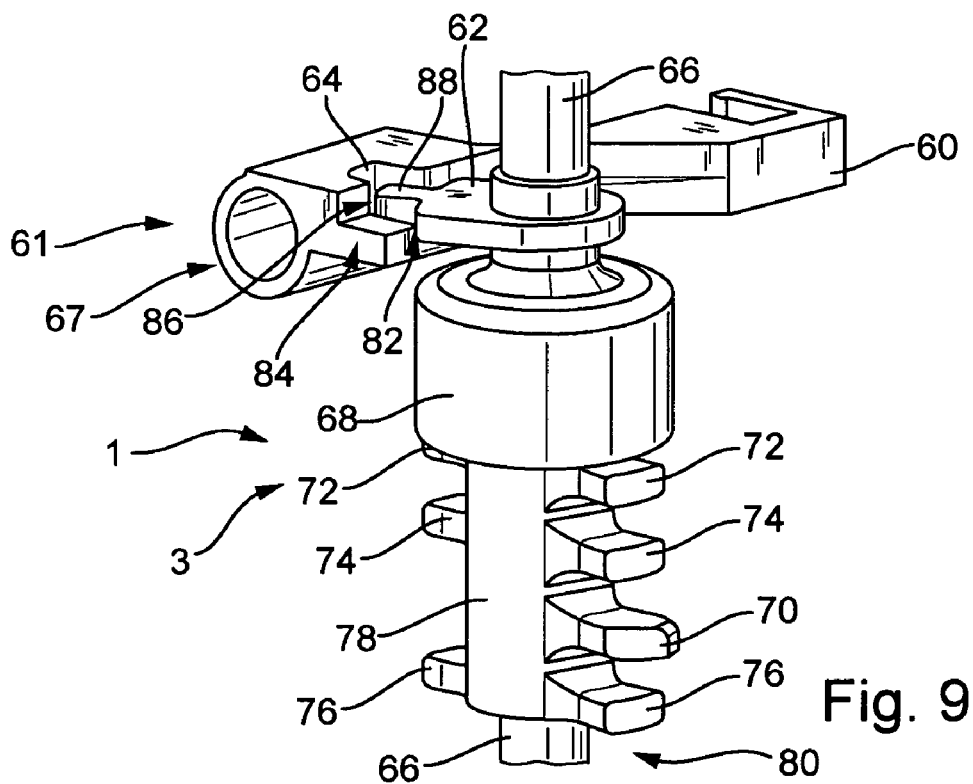

The main actuating element 70 can e.g., as FIGS. 7 to 9 show, be a (first) shift finger. The auxiliary actuating elements 72, 74, 76 e.g., as also shown in FIGS. 7 to 9, can be designed with wing shapes. The (first) shift finger 70 as well as the auxiliary actuating elements 72, 74, 76 extend essentially radially with respect to the gear-shift shaft 66. In this example—and this can also be different—the main actuating element 70 and the auxiliary actuating elements 72, 74, 76 are mounted tightly on and/or at a sleeve 78 that has a mounting and/or through hole, through which the gear-shift shaft 66 extends. The sleeve 78 is mounted on the gear-shift shaft 66 so that it moves axially and in rotation with it. The unit comprising the sleeve 78, as well as the main actuating element 70 and the auxiliary actuating elements 72, 74, 76 is also designated as shift lever 80.

In this design, the reverse gear is not integrated with the forward gears of the transmission and/or of the gear actuator 1 in active-interlock connection and is not synchronized. However it can also be provided that the reverse gear is synchronized. In an advantageous further development, at least the forward gears are designed so that they are synchronized. In this case, the active-interlock connection of the forward gears is especially such that, because of the design of the area of gear actuators 1 and/or due to the interaction of corresponding areas of the gear actuators 1 with the shift rails assigned to the forward gears, it is ensured that in each case only one forward gear of the transmission and/or of the same dividing gear can be engaged simultaneously. In this case, it is especially provided, that by means of auxiliary actuating elements 72, 74, 76 and/or disengagement geometries and/or auxiliary function surfaces, like e.g., radii and ejector edges, there will be an action on the shift rails of the forward gears that will not be engaged so that these are disengaged before the forward gear that forms an actual target gear is engaged. In this case it is especially provided that the main actuating element 70, which is provided for the actuation of the shift rails of the forward gears, can be moved back into its neutral position after the engagement of a forward gear—whereby in this neutral position, it is especially provided that selecting movements can be carried out without the previously engaged forward gear of the same transmission and/or dividing gear being disengaged again.

For example it can be provided that for engagement of the reverse gear, the sliding gear wheel and/or the shift sleeve is slid in by approx. 24 mm. To do this, the gear-shift shaft has to rotate 52 degrees. However, it should be noted here that these values are only by way of example and oriented to a special design that has already been implemented, so clearly deviating values may be provided, depending on the design. In addition to the main function surfaces and auxiliary function surfaces and/or disengagement geometries, engagement geometries, radii and ejector edge and/or main 70 and auxiliary actuating elements 72, 74, 76 for the engagement and disengagement the forward gears, in the design according to FIGS. 7 to 10 it is provided that an actuating element, in this case (second) shift finger 62 is provided for the engagement and disengagement of a reverse gear. The (second) shift finger 62 is also provided for sliding the shift rail 60 of the reverse gear.

Both for the engagement as well as for the disengagement of the reverse gear, the (second) shift finger 62 can engage with actuation in the shift jaw 64 of the shift rail 60 of the reverse gear. The corresponding actuation can be carried out in that the gear-shift shaft 66 for engagement of the reverse gear is turned in one rotation direction, and moved in the opposite rotation direction for disengagement of the reverse gear. This means it is especially provided that because of a corresponding turning of the gear-shift shaft 66 with a corresponding axial position of the (second) shift finger 62 the reverse gear can be engaged, whereby as a result the (second) shift finger 62 correspondingly engages and/or moves the shift rail of the reverse gear, and whereby when the gear-shift shaft 66 and thus the (second) shift finger 62 is turned back, reverse gear is disengaged directly again. To this extent the specific reverse gear design differs from a design with an active-interlock connection, in which moving back the (first) shift finger 62 and/or main actuating elements 70 is possible, without the previously engaged gear being disengaged again in the process. However, in an advantageous design it is provided that the (second) shift finger 62, which is provided for the engagement and disengagement of the reverse gear, works together with an active-interlock connection of the forward gears in such a way that during engagement of the reverse gear by means of the (second) shift fingers 62, the forward gears and/or the forward gear in the same transmission or dividing gear is shifted by means of the auxiliary actuating elements 72, 74, 76 of the active-interlock connections and/or by means of an ejector of a shift levers 80. This can be such that, during and/or before a corresponding engagement of the reverse gear, the gears 1, 3 and 5 are disengaged, and in fact especially using the auxiliary actuating elements and/or ejector of the shift levers. Ultimately however, this depends on the concrete transmission design and gear ratio, so instead of the gears 1, 3 and 5, other gears and/or a deviating gear combination can also be produced.

According to the design according to FIGS. 7 to 10—as already mentioned—a first blocking cylinder 68 is also provided. This first blocking cylinder 68 is provided at and/or on the gear-shift shaft 66. This first blocking cylinder 68 is especially provided for the purpose of preventing unintended slipping of the sliding gear wheel and/or the shift sleeve of the reverse gear and/or an unintended movement of the shift rail 60 for the reverse gear. The first blocking cylinder 68 can be a component of the gear-shift shaft 66 and be designed with it as a single part and/or as a separately manufactured component that is mounted at and/or on the gear-shift shaft 66. The first blocking cylinder 68 and/or the shift rail 60 for the reverse gear is designed in such a way that the first blocking cylinder 68 and the shift rail 60 for the reverse gear, in cooperation, prevent a movement of the shift rail 60 of the reverse gear and/or a movement of the reverse gear wheels and/or of the shift sleeve assigned to the reverse gear. To prevent this movement and/or an unintended slipping of the sliding gear wheel, the first blocking cylinder 68 engages in the shift rail 60 of the reverse gear, and/or this first blocking cylinder 68 can engage in the shift rail 60 mentioned above. This is especially true in that the shift rail 60 of the reverse gear is held by the first blocking cylinder 68 in specific positions and/or when the reverse gear wheel and/or the shift sleeve of the reverse gear wheels and/or the shift rail 60 of the reverse gear should not be moved—also especially if forward gears are engaged. This holding can be provided, e.g. by a positive engagement connection between the shift rail 60 of the reverse gear and the first blocking cylinder 68. As can be seen from the embodiment example according to FIGS. 7 to 10, the first blocking cylinder 68 is at an axial distance from the (second) shift finger 62 that is provided for the engagement and disengagement of the reverse gear. This distance is preferably a smaller distance. It is especially provided that in axial positions of the gear-shift shaft 66, in which a forward gear can be engaged by a corresponding turning of the gear-shift shaft 66, the first blocking cylinder 68 blocks the shift rail 60 of the reverse gear appropriately. In this case it is especially provided, that only upon reaching and/or shortly before reaching the reverse gear gate, also especially when and/or shortly before the (second) shift finger 62 is positioned axially in the area of the shift jaws 64 of the shift rail 60 of the reverse gear, the first blocking cylinder 68 releases the shift rail 60 of the reverse gear, so that its movement is no longer blocked.

Also in the design according to FIGS. 7 to 10, the gear actuator 1 has—as already also mentioned with reference to the design according to FIGS. 1 to 4 and/or 5 and 6—at least one electric motor, which causes the movements for the selecting and the shifting. This can be such that separate electric motors are provided for the drive effects for the selecting and for the shifting; alternatively to this it can be provided that in each case the same, or exactly one, electric motor is provided for the drive movements for the selecting as well as for the drive movements for the shifting. The drive movements for the selecting and/or the drive movements for the shifting can be transferred to the gear-shift shaft 66 by means of corresponding transmission mechanisms, so that the gear-shift shaft 66 is moved axially for selecting and turned and/or swiveled for shifting.

In this case, the electric motor and/or the electric motors can—as also mentioned above—be controlled by an electronic control unit and be in signal connection with it for this purpose. In the electronic control unit, software can be stored that controls the corresponding actuations and/or the corresponding current application to the electric motor or the electric motors. Besides that, it can also be provided in the design according to FIGS. 7 to 10 that a position measuring system inside the actuator is provided, especially with at least one incremental position sensor. Such incremental position sensors can be positioned, e.g., on the output shaft of the electric motors and/or on the respective output shafts of the electric motors and record corresponding movements of the output shaft of these electric motors.

In particular in such a design, a fixed reference point is generally necessary for the interaction of the software with the gear actuator. This especially applies when the position measuring system is designed as an incremental position sensor and/or is formed of incremental position sensors. The compensation of the position measuring system involved can occur by approach of a fixed point of the transmission and/or of the gear actuators. One such point is designated as the reference point.

Such a reference point frequently lies on one side and/or at one of the two ends of the neutral gate and extends it by approx. one-half gate width. In the embodiment example according to FIGS. 7 to 10 this is such that the reference point lies below the reverse gear and/or is approached when the gear actuator 1 and/or its gear-shift shaft 66 is in its position that is moved as far down as possible. In this case it can be provided that—as already mentioned—the neutral gate is extended by approx. one-half gate width at the point mentioned.

In particular when the reference point lies below the reverse gear, the sliding gear wheel and/or the shift sleeve and/or the shift rail 60 that is assigned to the reverse gear is moved during a reference run. This is basically no problem, if it is adequately ensured that the reverse gear is not engaged during such a reference run. However, if there is a defect in the shift gate, for example, this movement of the sliding gear wheel and/or the shift sleeve and/or the shift rail 60—at least under unfavorable conditions—can lead to a case in which the reverse gear will be engaged unintentionally.

To prevent this, and/or reduce the probability of such an unintended engagement of the reverse gear during a reference drive, it is provided that the (second) shift finger 62, which is responsible for the engagement and disengagement of the reverse gear, in addition to the engagement geometry and/or geometries that cause the engagement or disengagement of the reverse gear, additionally has a second blocking part 82, that is e.g., a second blocking cylinder. By means this second blocking part 82—especially in cooperation with the shift rail 60 for the reverse gear—the reverse gear can be blocked, and especially during a reference run and/or when the corresponding axial position of the (second) shift fingers 62, in which the reference run is carried out, is present. In this way, a fixed transmission stop is formed.

Thus it is especially provided that the fixed transmission point and/or reference point through the (second) shift finger 62, which is provided for the engagement and disengagement of the reverse gear, and the shift rail 60 that is provided for the engagement and disengagement of the reverse gear, is created in that the (second) shift finger 62 contains a blocking cylinder surface, that especially cooperates in a corresponding way with the shift rail 60. This is especially true in that, when approaching of the reference points, the shift rail 60 of the reverse gear and the (second) shift finger 62 block in each other. In this case, the reference point especially lies—as discussed—in selecting direction below the actual reverse gear gate, and/or overlapping it.

It is especially provided that the shift rail 60 for the reverse gear is designed in such a way that in the actuator position in which the reference point is approached, the shift rail 60 for the reverse gear interacts with the second blocking part 82 in such a way that a movement of this shift rail 60 is blocked during approaching of the reference point and/or or during stress on the shift rail 60 caused by this, while on the other hand it works together with the second blocking part 82 in such a way that when the actuator is positioned in the area the shift track for the reverse gear, the reverse gear can be engaged and disengaged again.

As can be seen well in FIGS. 7 to 10, the shift rail 60 of the reverse gear—especially for this purpose—has different profiles 84, 86. These profiles 84, 86 are—seen in axial direction of the gear-shift shaft 66—arranged adjacent to the shift rail 60 of the reverse gear. The shift rail 60 of the reverse gear extends with its longitudinal extension direction—like the shift rails of the forward gears that are not shown—perpendicularly, and especially vertically, to the longitudinal axis of the gear-shift shaft 66.

A first 84 of this profiles 84, 86 is designed in such a way that the second blocking cylinder and/or the second blocking part 82 can interact with this first profile 84 for blocking the reverse gear and/or for blocking an axial movement of the shift rail 60 for a reverse gear. This first profile 84 is designed as a (profiled) projection in FIGS. 7 to 10. In a plane lying over FIGS. 7 to 9, a second profile 86 of the shift rail 60 for the reverse gear is provided, which is such that the (second) shift finger 62 can be swiveled without its second blocking part 82 bumping into the shift rail 60 of the reverse gear.

The shift jaw 64 of the shift rail 60 for the reverse gear is designed in such a way, that it—seen in axial direction the gear-shift shaft 66—extends into the area in which the first 84 profile is provided and into the area in which the second profile 86 is provided.

In the plane and/or in the area of the shift rail 60 lying in the axial direction the gear-shift shaft 66, in which the second profile 86 is provided, the (second) shift finger 62 can move the shift rail 60 for engaging and disengaging reverse gear over its corresponding area 88 provided for engaging and disengaging the reverse gear by turning the gear-shift shaft 66, whereby the second blocking part 82 of the (second) shift fingers 62 and/or the interaction of this second blocking part 82 with the second profile 86 of the shift rail 60 does not block a corresponding swiveling.

In the area of shift rail 60 lying in the plane and/or in the axial direction of the gear-shift shaft 66, in which the first profile 84 the shift rail 60 for the reverse gear is provided, the shift rail 60 of the reverse gear can be stressed by the area 88 of the (second) shift finger 62 in such a way that it would basically be slid, whereby a corresponding movement of the shift rail 60 would be counteracted in that the second blocking part 82 counteracts, with blocking, the movement mentioned with first profile 84.

In the overview of FIGS. 7 to 9 it can be seen that in FIG. 7 the gear-shift shaft 66 has an axial position in which the first blocking part 68 is active, i.e. the first blocking part 68 prevents the reverse gear from a movement that would be necessary in order to engage a reverse gear. In this case, the first blocking part 68 extends over an area that is dimensioned in such a way that all of the forward gears of the transmission and/or of the same dividing gear can be engaged without the first blocking part 68 being moved out of its blocking position. In the position according to FIG. 7 the gear actuator 1 is in a forward gear gate and/or can be in a forward gear gate.

FIG. 8 shows an axial position of the gear-shift shaft 66, in which the (second) shift finger 62 and/or its area 88 engages in the shift jaw 64 of the shift rail 60 of the reverse gear in such a way that this shift rail 60 can be actuated appropriately here for engagement and disengagement of the reverse gear. In this case, actually the second blocking part 82 is not in a blocking position so the movement of the shift rail 60 of the reverse gear is not blocked because of this second blocking part 82. In this case, the first blocking part 68 is also not in a blocking position here so that the movement the shift rail 60 of the reverse gear is also not blocked because of this. The gear actuator 1 is in the position according to FIG. 8 in the reverse gear gate.

Figure 10:
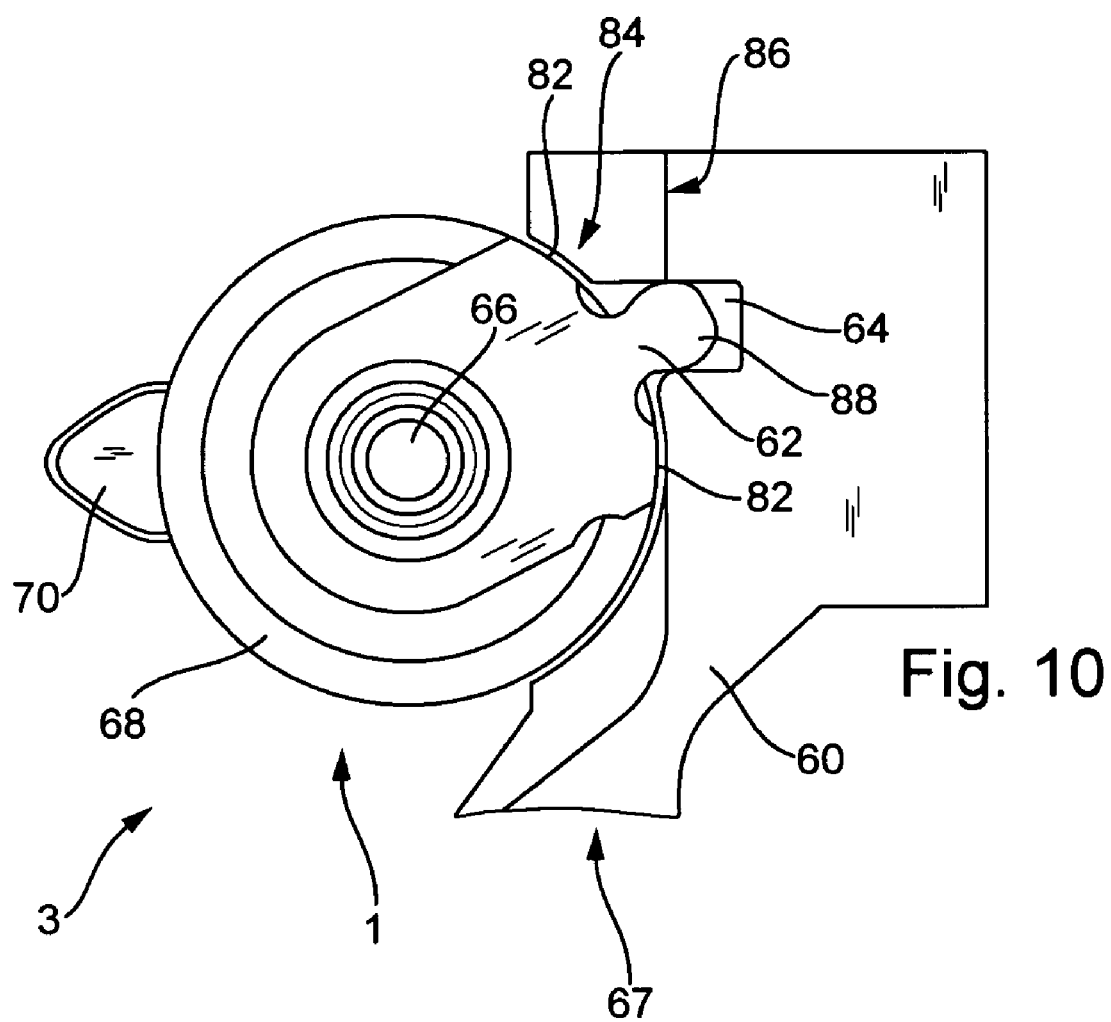
Figure 11:
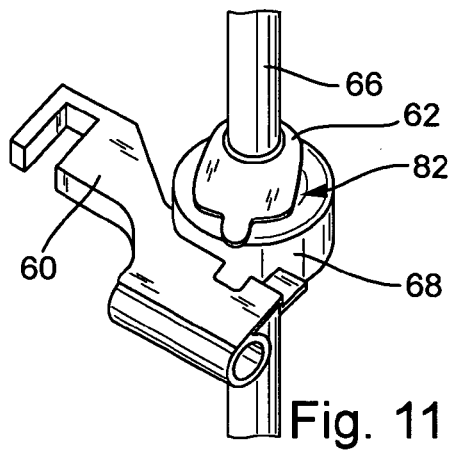
FIGS. 11 to 14 show an example embodiment of a gear actuator according to the invention in partial view, whereby these figures show several views.
Figure 12:
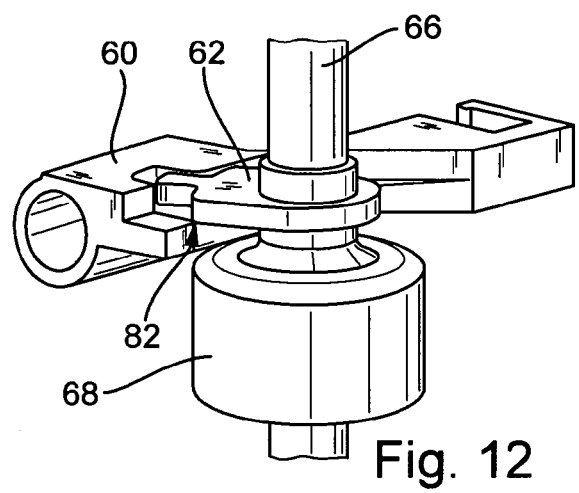
Figure 13:
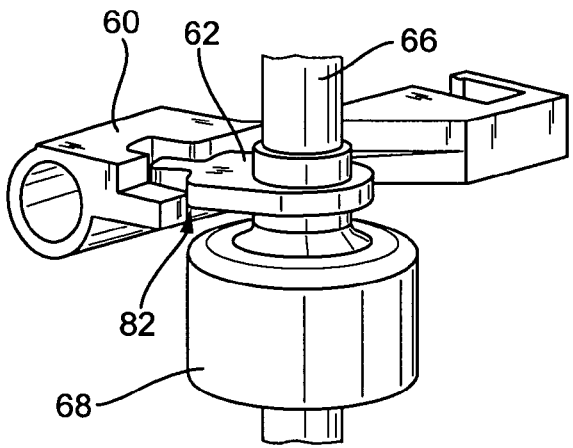

FIGS. 9 and 10 each show a position in which the area 88 of the (second) shift fingers 62 engages in the shift jaw 64 of the shift rail 60 for the reverse gear, but whereby the second blocking part 82 works together with the first profile 84 of the shift rail 60 simultaneously in such a way that by turning the gear-shift shaft 66, a reverse gear cannot be engaged and/or a corresponding movement of the shift rail 60 of the reverse gear is blocked. In this case, the gear actuator 1 and/or the (second) shift finger 62 are (at least partially) below the reverse gear gate.

In the position according to FIG. 7, the movement of the shift rail 60 of the reverse gear is also blocked by means of the first blocking parts 68, whereby it is especially provided that the second blocking part 82 does not act with blocking on this shift rail 60 and in the position according to FIG. 9 the movement of the shift rail 60 of the reverse gear is blocked by means of the second blocking part 82, whereby it is especially provided that the first blocking part 68 does not act with blocking on this shift rail 60; in the position according to FIG. 8 none of the blocking parts 68, 82 act with blocking on the shift rail 60 of the reverse gear. FIG. 10 shows a view from above.

In an advantageous design, this gear actuator 1 has a vertical installation position. This is especially true in that the gear actuator 1 and/or its gear-shift shaft 66 are aligned vertically if this gear actuator 1 is installed in a motor vehicle. However, with such a vertical installation position, the danger can exist that the gear-shift shaft 66 can fall downward if there is a defect or a broken component inside the selection kinematics and/or selection mechanism. In an advantageous design—as indicated in FIG. 9—it is provided that the reverse gear gate in the transmission is in the lowest position—especially with respect to the positions of the gear-shift shaft 66 and/or of the actuator 1, which have to be approached to approach the gear gates. Because of a previously described design of the reverse gear lever and/or of the actuating elements 62 for the engagement and disengagement of the reverse gear and/or of the (second) shift fingers 62, in which this and/or these is/are provided with a second blocking part 82, in this case (also) an unintended engagement of the reverse gear is prevented—especially if the lowest position (the selection gate) lies below the reverse gear gate. Basically otherwise the danger can exist that the reverse gear will be engaged unintentionally after an error and/or if there is a broken component inside the selection kinematics and/or selection mechanism.

However that is not intended to mean that designs with the second blocking part 82 mentioned always have to be combination with a vertical alignment and especially with such a vertical alignment, in which the reverse gear gate is the gear gate that is placed lowest—especially also related to the axial position the of gear-shift shaft 66.

It should be noted that, in a preferable design, the design according to FIGS. 7 to 10 is combined with a design according to FIGS. 1 to 4 or with a design according to FIGS. 6 and 7.

The design according to FIGS. 7 to 10 is preferably used in an automated manual transmission (ASG) or a double-clutch transmission (DKG) or a parallel transmission (PSG).

The first blocking part 68 and/or the first blocking cylinder 68 is preferably is made up of a cylinder closed around the circumference. This can, e.g., be arranged concentrically to the gear-shift shaft 66. The second blocking part 82 and/or the second blocking cylinder 82 is preferably formed of at least one, preferably exactly one or exactly two, curved upper surface section(s) that preferably has a constant radius and is also designated as radius on the shift finger.

Figure 14:
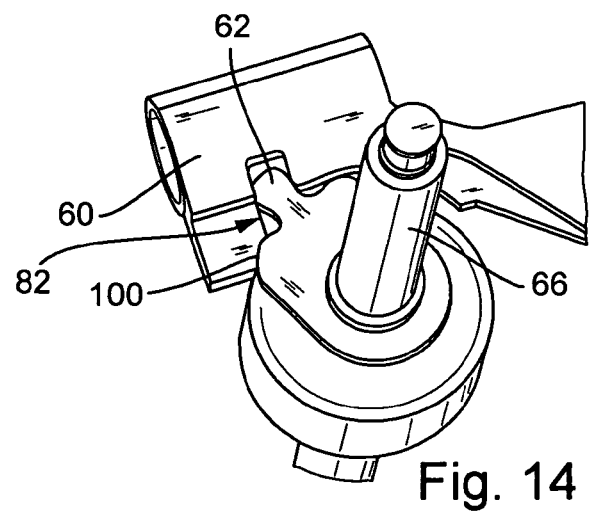

Such a radius on the shift finger, by which the blocking is carried out, is provided in FIG. 14 with the reference number 100.

FIGS. 11 to 14 show an example of a design according to the invention that essentially corresponds to the design according to FIGS. 7 to 10. Also the positions shown in FIGS. 11 to 14 correspond—in this sequence—essentially to the positions according to FIGS. 7 to 10. However, in the design according to FIGS. 11 to 14 a small cut-out is shown, in comparison to FIGS. 7 to 10.

Using FIGS. 15 to 19, examples of further developments of the designs according to the invention explained as examples using FIGS. 1 to 14 will now be explained in more detail. The designs according to FIGS. 15 to 19 can be used individually or in combination with the examples of designs explained with FIGS. 1 to 14 or further developed in any other way.

Figure 15:
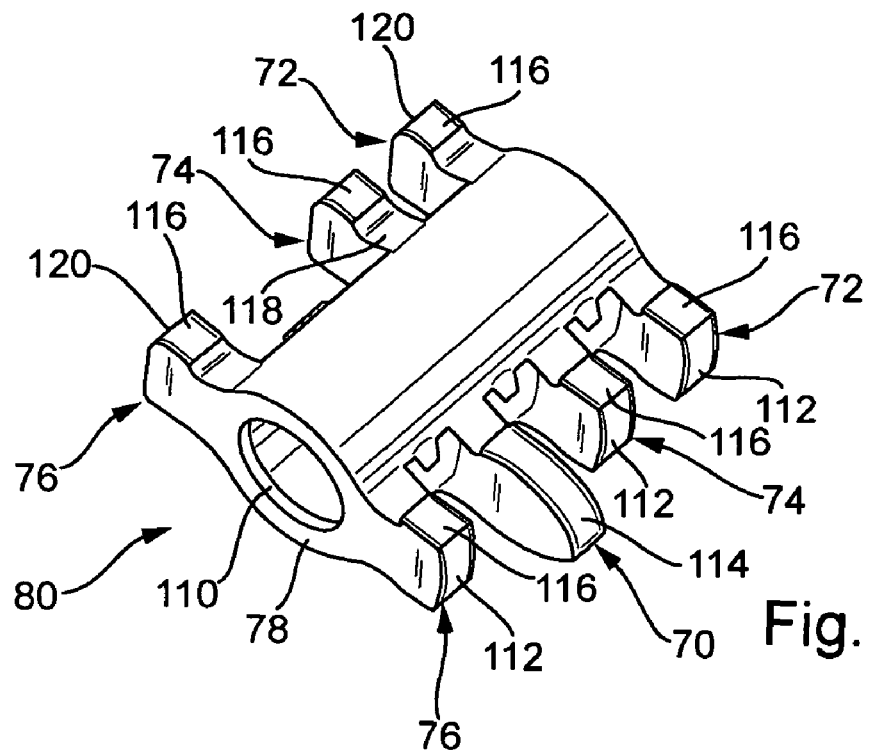
FIG. 15 shows an example of a shift lever, in which the e.g. component of the gear actuator can be according to FIG. 1 to 4 or according to FIGS. 5 and 6 or according to FIG. 7 to 10 or according to FIG. 11 to 14.

FIG. 15 shows an example of a shift lever 80 for a gear actuator 1. This shift lever 80 is designed as a single part and has a main actuating element 70, which in this case is a (first) shift finger, as well as several auxiliary actuating elements 72, 74, 76 and a sleeve 78.

The sleeve 78 is provided with a mounting hole 110 for mounting the gear-shift shaft 66. This mounting hole 110 is designed as a through hole but can also be designed as a pocket hole.

The first shift finger 70 and the auxiliary actuating elements 72, 74, 76 extend radially from the sleeve 78. The auxiliary actuating elements 72, 74, 76 are each designed as wings and have two halves, that extend radially from opposite sides of the sleeve 78 radial.

The auxiliary actuating elements 72, 74, 76 have blocking cylinders and/or blocking cylinder surfaces 112 lying radially on the outside, but these should not be confused with the first 68 or second blocking part 82, that was discussed above.

The shift lever 80 of the gear actuators 1 shown in FIG. 15 has, as its main function surfaces, the engagement surfaces and/or engagement geometry 114 for shifting the gears and the ejector and/or disengagement geometry 116 for the disengagement the gears. The profiles of these surfaces 114, 116 are coordinated to each other with respect to active-interlock functionality. In addition to these main function surfaces 114, 116, the shift lever 80 also has auxiliary function surfaces in the form of chamfers and/or radii 118, which in the case of small intersections with the internal shifting, provide that the shifting, selecting process is not blocked and the components can slide past each other, and ejector edges 120. In addition, the auxiliary actuating elements 72, 74, 76 and/or the ejector have a sharp-edged transition from the ejector surface and/or disengagement geometry 116 for the blocking cylinder surface 112. The disengagement geometries 116, the blocking cylinder surfaces 112 and auxiliary function surfaces, as well as the chamfers and/or radii 118 and ejector edges 120, are each formed on the auxiliary actuating elements 72, 74, 76 and the engagement geometry 114 is formed on the main actuating element 70.

The auxiliary function surfaces can be manufactured, e.g., in that the profiles can be approached individually with a small milling cutter. In particular in series production, it can be advantageous, especially under consideration of costs, that the shift lever 80 is manufactured as a forged part with subsequent mechanical machining. This can be such that, e.g., the main function surfaces and the auxiliary function surfaces are created directly by the forging process. In particular with the auxiliary actuating elements 72, 74, 76 the transition problem between main function surfaces and auxiliary function surfaces no longer exists and/or is smaller since the natural transition radii of the forging die is used. The subsequent machining is a simple turning operation to create the mounting hole 110 and the blocking cylinders 112. In this case, the sharp transition between ejector surface 116 and blocking cylinder 112 is created in a natural way.

The number of auxiliary actuating elements 72, 74, 76 especially depends on the number the gears in the transmission and/or the number of gears in the dividing gear, and is preferably selected in such a way that the active-interlock functionality is ensured.

In an advantageous further development of the design according to FIGS. 1 to 4 or the design according to FIGS. 5 and 6 or the design according to FIGS. 7 to 10 or the design according to FIGS. 11 to 14, the example shift lever 80 according to FIG. 15 in these designs can be mounted on the gear-shift shaft 58 and/or 66, and especially so that it moves in rotation and axially with it.

In an advantageous design, the gear actuator 1 according to the invention, and especially a gear actuator 1 according to the invention designed according to one of the figures (descriptions) above, is mounted and/or fastened on a transmission housing, and especially bolted. In this case, the gear actuator 1 can be enclosed entirely or partially in an actuator housing, whereby this actuator housing can especially bolted on the transmission housing. It can also be provided that the gear actuator 1 and/or the actuator housing are sealed with respect to the transmission housing. In this case it can be provided, e.g., that a sealing plane and a bolting plane are formed that are components of the interface between the gear actuator 1 and the transmission housing or form it.

According to of a preferable design it is provided here that the sealing plane and the bolting plane coincide.

Figure 16:
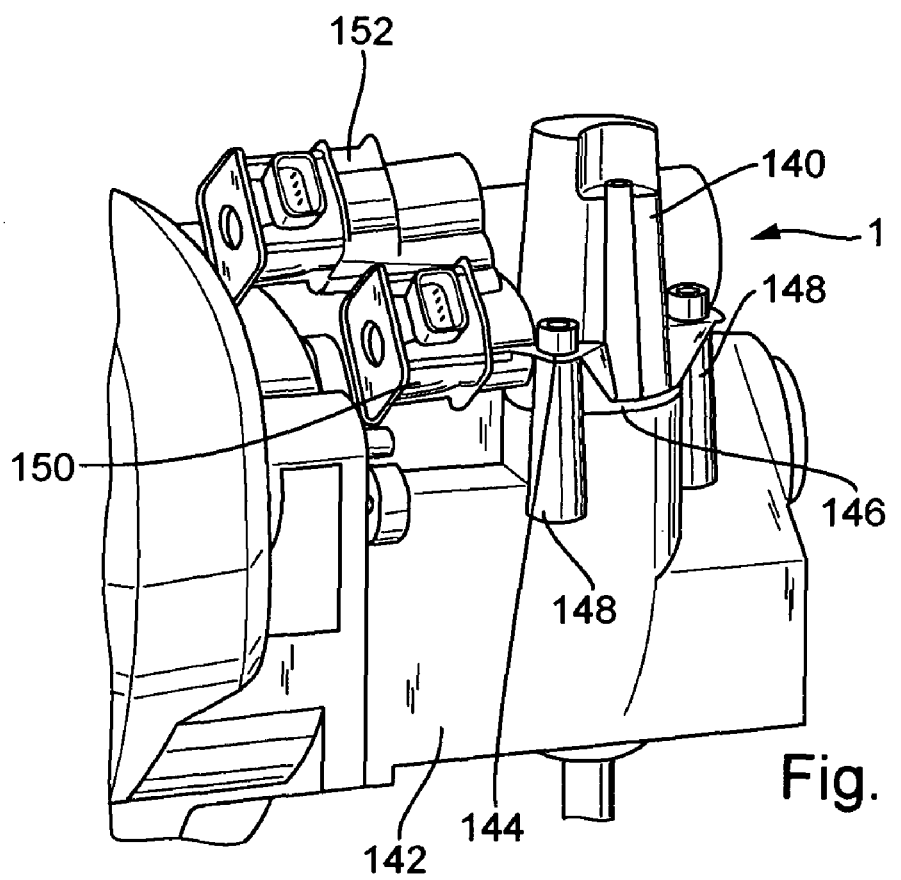
FIG. 16 shows an example of a further development of the invention, which can also be used, e.g., in the design according to FIG. 1 to 4 or in the design according to FIGS. 5 and 6 or in the design according to FIG. 7 to 10 or in the design according to FIG. 11 to 14.

FIG. 16 shows another modified preferable design, in which gear actuator 1 and/or an actuator housing 140 is bolted on the transmission housing 142 and is sealed with respect to it, but whereby the bolting plane 144 is at a distance from the sealing plane 146 and/or these planes are separated. In this case, it is such that the bolting plane 144 is shifted upward with respect to the sealing plane 146. For this purpose, (mounted) screw-on domes 148 are provided. In this example, these screw-on domes 148 are designed on the transmission housing 142. Such a design makes it possible, e.g., to place the center of gravity of the selector motor 150 directly in the separating joint of the threaded connection. Because of this, a very stable connection develops with respect to vibrations. Such a design can also offer advantages with respect to the construction space on the inside of the transmission.

In the embodiment example shown in FIG. 16, the gear actuator 1 has two electric motors, namely the selector motor 150 and the shifting motor 152. However, it can also be provided alternatively, e.g., that the gear actuator 1 only has one electric motor that generates the drive movements for the selecting and for the shifting.

A gear actuator 1 according to the invention, and especially a gear actuator 1 according to the embodiment examples according to the invention that were explained using FIGS. 1 to 4 and/or FIGS. 5 and 6 and/or FIGS. 7 to 10 and/or the FIG. 11 to 14 can have, e.g., a spindle. It can also be provided that the gear actuator 1 has a ring gear transmission. Example designs of a gear actuator 1 according to the invention, in which a spindle and a ring gear drive are provided as a further development, and the design of which can especially also be combined with the designs according to the described FIGS. 1 to 14, will be explained in the following using FIGS. 17 to 19.

According to the preferable further development, the gear actuator 1 has a ring gear transmission as the first ratio step. In it, the drive pinion is formed by the engine shaft and the drive element is a ring gear 160 that sits on the spindle 162. The drive torque of the ring gear 160 is transferred to the spindle.

Figure 17:
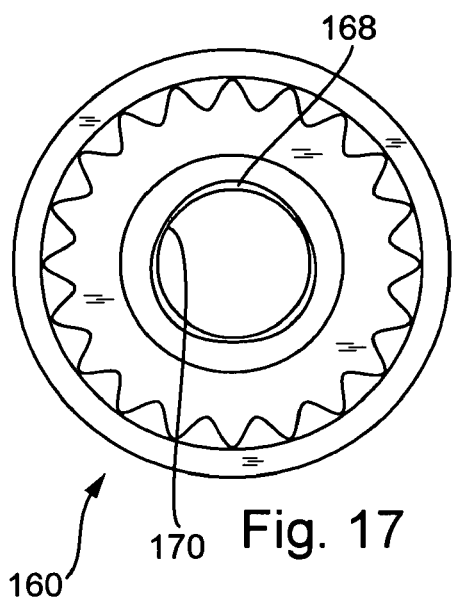
FIGS. 17 and 18 show an example of a ring gear in two views, that can be, e.g., a component of the gear actuator according to FIG. 1 to 4 or according to FIGS. 5 and 6 or according to FIG. 7 to 10 or according to FIG. 11 to 14; and, FIG. 19 shows an example unit with a ring gear and a spindle, whereby this unit can be, e.g., component of the gear actuator according to FIG. 1 to 4 or according to FIGS. 5 and 6 or according to FIG. 7 to 10 or according to FIG. 11 to 14.
Figure 18:
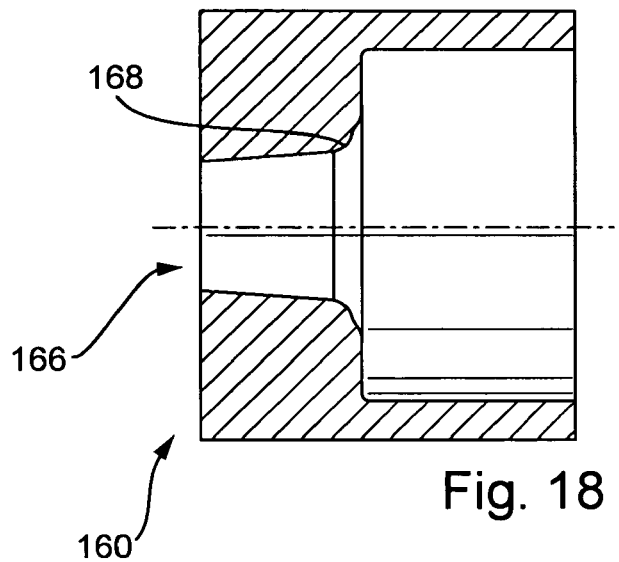
Figure 19:
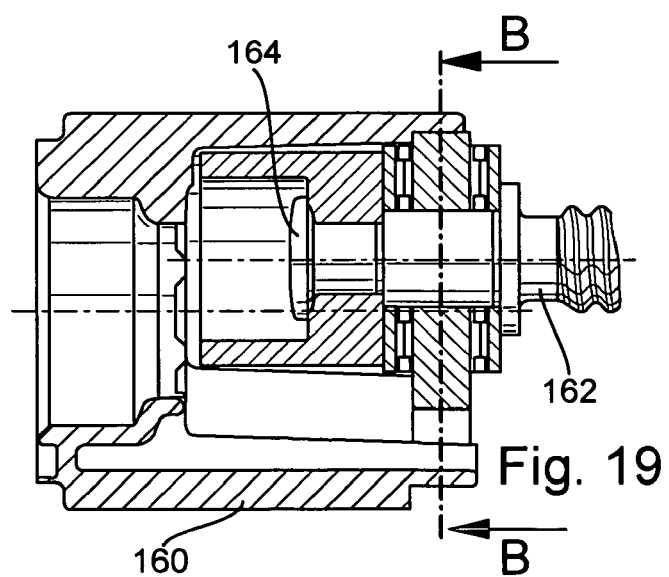

According to a preferable design—which is not shown in FIGS. 17 to 19—to do this, a slave gearing can be used. The slave gearing on the spindle 162 is produced by rolling in an additional work step. In the ring gear 160, the slave gearing occurs semi-automatically, e.g., because of the profile of the stamp during a sintering process. However, flash formation during sintering can be problematic. The flash that develops prevents joining of the two parts and must be monitored continuously during manufacturing of the ring gear permanent.

Because of the bearing concept of the spindle 162, the high axial force is supported on ring gear 160. To do this, the spindle 162 requires an axial safeguard that is able to absorb these high forces. Preferably this occurs by tumbling of the free spindle end. The closing head 164 that develops should be able to absorb forces and especially serves as the axial safeguard.

In the design according to FIGS. 17 to 19, a riveting process is used to create a positive engagement in the circumference direction. This eliminates the work step "rolling" during the spindle manufacturing and the manufacturing and/or quality control of the ring gear 160 is simplified.

In order to achieve this, the ring gear 160 gets a special mounting contour 166. The inner contour 166 starts with a cylinder for centering on the spindle 162. Then the cylinder opens and changes continuously into a polygon profiles 168. The inner circle of the polygon profile 168 corresponds here to the cylinder diameter. During tumbling of the spindle 162, the spindle material is pressed into the polygon of the ring gear 160, so that a positive engagement torque pulling and a very stable "closing head" 164 occur for absorbing the high axial forces.

FIG. 17 shows this ring gear 160 designed with a polygon profile 168 from the front and FIG. 18 shows the ring gear according to FIG. 17 in cross section. In FIGS. 17 and 18, the centering diameter is designated with the reference number 170. FIG. 19 shows a design, in which the ring gear 160 according to FIGS. 17 and 18 is installed together with the spindle 162.

REFERENCE NUMBER LIST

| | |
|---|---|
| 1 | Gear actuator |
| 2 | Shift gate and/or shift gate |
| 3 | Transmission design |
| 10 | First shift gate part, in this case axle and/or shaft |
| 12 | Second shift gate part, in this case shift gate plate |
| 14 | Perforation and/or groove in 10 |
| 16 | Perforation and/or groove in 10 |
| 16a | Groove base of 16 |
| 18 | Perforation and/or groove in 10 |
| 18a | Groove base of 18 |
| 20 | Perforation and/or groove in 10 |
| 22 | Perforation and/or groove in 10 |
| 24 | 14 adjacent to the wall section of 10 |
| 26 | 14 adjacent to the wall section of 10 |
| 28 | (Profile)elevation and/or radial projection with respect to 16a, 18a of 10 |
| 30 | Passage opening in 12 |
| 32 | Central longitudinal axis the gear-shift shaft |
| 34 | Section of 12 lying radially on the outside, arc |
| 36 | Recess of 12 |
| 38 | Area of 12, which can swivel into 14 and/or 16 and/or 18 and/or 20 and/or 22 |
| 40 | Area of 12, which can swivel into 14 and/or 16 and/or 18 and/or 20 and/or 22 |
| 42 | Guide chamfer at 10 |
| 56 | Gear wheel on 58 |
| 58 | Gear-shift shaft |
| 60 | Shift rail for reverse gear |
| 61 | Inner gear shift |
| 62 | Actuating element for engagement and disengagement of the reverse gear, second shift finger |
| 64 | Shift jaw of 60 |
| 66 | Gear-shift shaft |
| 67 | Final output mechanism of 61 of the reverse gear |
| 68 | First blocking part, especially blocking cylinder for reverse gear |
| 70 | Main actuating element of 80 |
| 72 | Auxiliary actuating element of 80 |
| 74 | Auxiliary actuating element of 80 |
| 76 | Auxiliary actuating element of 80 |
| 78 | Sleeve of 80 |
| 80 | Shift lever |
| 82 | Second blocking part and/or second blocking cylinder |
| 84 | First profile of 60 |
| 86 | Second profile of 60 |
| 88 | Area of 62 |
| 100 | Radius at 62 |
| 110 | Mounting hole of 80 |
| 112 | Blocking cylinder surface of 72 and/or 74 and/or 76 |
| 114 | Engagement surfaces and/or engagement geometry |
| 116 | Ejector and/or disengagement geometry |
| 118 | Radius and/or chamfer at 80 and/or 72, 74, 76 |
| 120 | Ejector edge at 80 and/or 72, 74, 76 |
| 140 | Actuator housing |
| 142 | Transmission housing |
| 144 | Bolting plane between 1 and/or 140 and 142 |
| 146 | Sealing plane between 1 and/or 140 and 142 |
| 148 | Screw-on dome an 140 |
| 150 | Selector motor of 1 |
| 152 | Shifting motor of 1 |
| 160 | Ring gear of 1 |
| 162 | Spindle of 1 |
| 164 | Closing head of 1 |
| 166 | Mounting contour of 160 |
| 168 | Polygon profile of 160 |
| 170 | Centering diameter of 160 |

What is claimed is:

1. A gear actuator for a motor vehicle transmission design (3), that has several ratio steps for forming gears, whereby the gear actuator (1) comprises a gear-shift shaft (58, 66) that is operatively arranged so the gear-shift shaft can move in rotation for the shifting of gears and can move axially for the selection of gears, and a shift gate (2), wherein the shift gate (2) includes a fixedly mounted first shift gate part (10), a second shift gate part (12) that is coupled to the gear-shift shaft so the second shift gate part can move axially and in rotation with respect to an axis of the gear-shift shaft, and wherein the first shift gate part (10) has several recesses (14, 16, 18, 20, 22), wherein the recesses are spaced from each other in an axial direction substantially parallel to an axis of the gear shift shaft, into each of which recesses the second shift gate part (12) can rotate, depending on an axial position of the second shift gate part, wherein the axially spaced recesses (14, 16, 18, 20, 22) of the first shift gate parts (10) are assigned to different shift tracks of the gear actuators (1) and that in the positions of the gear actuator (1), in which it is positioned outside of a shift track, the first (10) and the second shift gate part (12) connect with positive engagement to block a movement capability of the second shift gate part (12).

2. The gear actuator according to claim 1, wherein the first shift gate part (10) is designed so it is essentially rotationally symmetrical.

3. The gear actuator according to claim 1, wherein the axially spaced recesses (14, 16, 18, 20, 22) of the first shift gate parts (10) are each designed as a groove or a ring groove.

4. The gear actuator according to claim 1, wherein the number of the axially spaced recesses (14, 16, 18, 20, 22) of the first shift gate parts (10) corresponds to the number of shift tracks of the gear actuators (1).

5. A gear actuator for a motor vehicle transmission design (3), that has several ratio steps for forming gears, whereby the gear actuator (1) comprises a gear-shift shaft (58, 66) that is operatively arranged so the gear-shift shaft can move in rotation for the shifting of gears and can move axially for the selection of gears, and a shift gate (2), wherein the shift gate (2) includes a fixedly mounted first shift gate part (10), a second shift gate part (12) that is coupled to the gear-shift shaft so the second shift gate part can move axially and in rotation with respect to an axis of the gear-shift shaft, and wherein the first shift gate part (10) has several recesses (14, 16, 18, 20, 22), wherein the recesses are spaced from each other in an axial direction substantially parallel to an axis of the gear shift shaft, into each of which recesses the second shift gate part (12) can rotate, depending on an axial position of the second shift gate part, wherein the axially spaced recesses (14, 16, 18, 20, 22) of the first shift gate parts (10) are each limited by opposite wall sections (24, 26) that are provided radially on the outside with guide chamfers (42).

6. A gear actuator for a motor vehicle transmission design (3), that has several ratio steps for forming gears, whereby the gear actuator (1) comprises a gear-shift shaft (58, 66) that is operatively arranged so the gear-shift shaft can move in rotation for the shifting of gears and can move axially for the selection of gears, and a shift gate (2), wherein the shift gate (2) includes a fixedly mounted first shift gate part (10), a second shift gate part (12) that is coupled to the gear-shift shaft so the second shift gate part can move axially and in rotation with respect to an axis of the gear-shift shaft, and wherein the first shift gate part (10) has several recesses (14, 16, 18, 20, 22), wherein the recesses are spaced from each other in an axial direction substantially parallel to an axis of the gear shift shaft, into each of which recesses the second shift gate part (12) can rotate, depending on an axial position of the second shift gate part, wherein positions of the second shift gate part (12), in which of this second shift gate part (12) is swiveled into a recess (14 and/or 16 and/or 18 and/or 20 and/or 22) of the axially spaced recesses (14, 16, 18, 20, 22) of the first shift gate part (10), there is a positive engagement between the first (10) and the second shift gate parts (12) in selecting direction and/or in axial direction of the first shift gate parts (10) so the selecting and/or an axial movement of the first shift gate parts (10), and thus an axial movement of the gear-shift shaft (58, 66) is locked and/or blocked.

* * * * *